Feb. 23, 1971 — L. E. SODERQUIST — 3,564,649
TIRE PRESS LOADER AND UNLOADER
Filed Jan. 21, 1969 — 7 Sheets-Sheet 1

INVENTOR.
LESLIE E. SODERQUIST
BY Hamilton, Cook, Renner & Kenner
ATTORNEYS

INVENTOR.
LESLIE E. SODERQUIST
BY Hamilton, Cook,
Renner & Kenner
ATTORNEYS

Feb. 23, 1971 L. E. SODERQUIST 3,564,649
TIRE PRESS LOADER AND UNLOADER
Filed Jan. 21, 1969 7 Sheets-Sheet 6

INVENTOR.
LESLIE E. SODERQUIST
BY Hamilton, Cook,
Renner & Kenner
ATTORNEYS

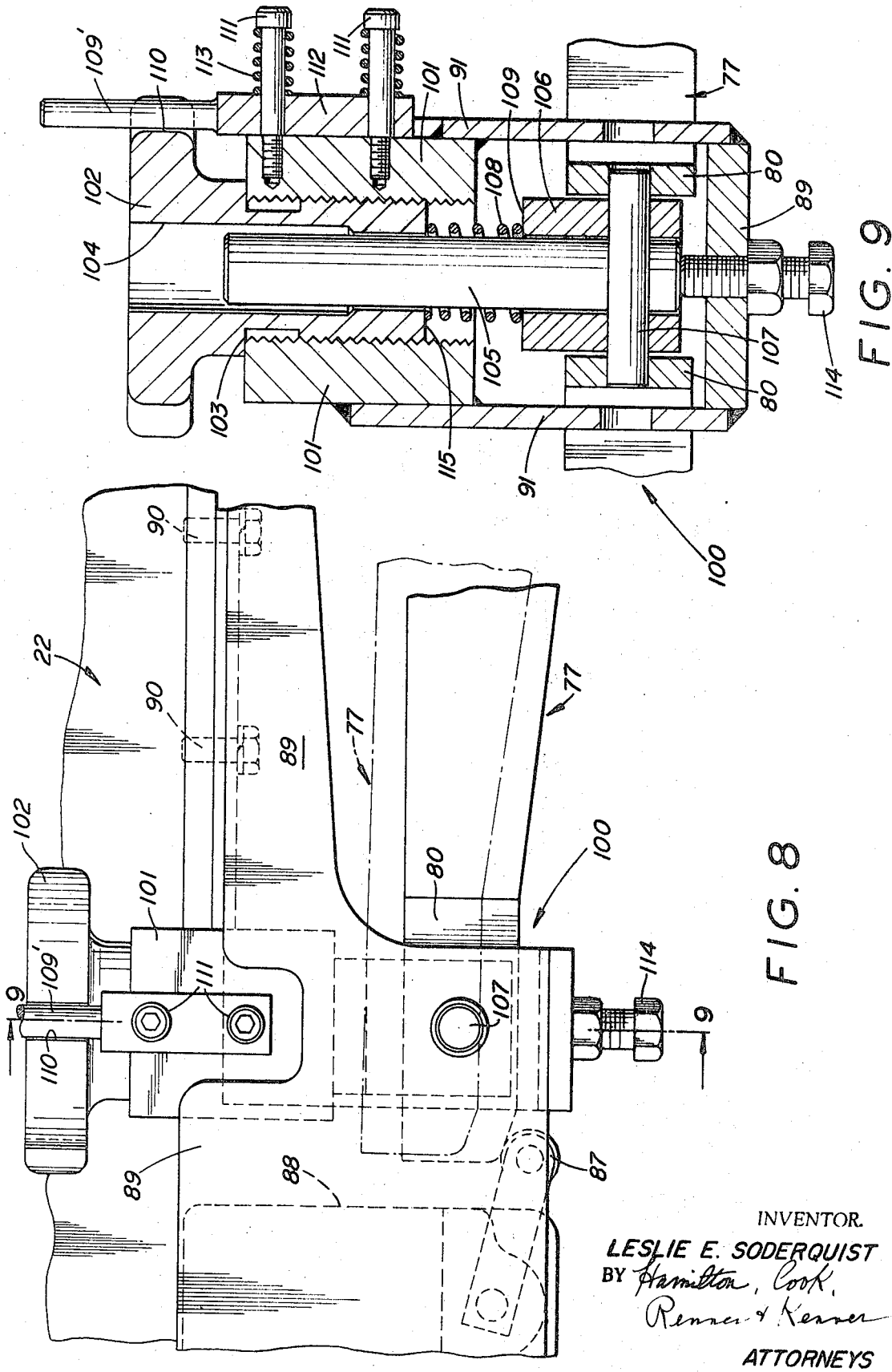

United States Patent Office 3,564,649
Patented Feb. 23, 1971

3,564,649
TIRE PRESS LOADER AND UNLOADER
Leslie E. Soderquist, Silver Lake, Ohio, assignor to McNeil Corporation, Akron, Ohio, a corporation of Ohio
Filed Jan. 21, 1969, Ser. No. 792,383
Int. Cl. B29b 5/02
U.S. Cl. 18—2
8 Claims

ABSTRACT OF THE DISCLOSURE

A device for automatically loading and unloading a tire vulcanizing press. A loading and unloading chuck having gripping means is controlled by a pivoted motor so that tires, particularly large and heavy tires, can be adequately and safely carried to and from the press. The pivoted motor enables the chuck to maintain a sufficient and substantially constant radial holding force on the bead area of the tire so that no slippage occurs.

BACKGROUND OF THE INVENTION

This invention relates to the controlled loading and unloading of tires into and out of a tire vulcanizing press. The apparatus is constructed to safely and accurately load and unload tires, particularly large off-the-road tires.

Automatic tire press loading and unloading concepts have been disclosed in a number of prior patents granted to the present inventor and owned by the assignee of the present application, including:

(a) Loaders—U.S. Pat. Nos. 2,927,343; 2,976,566; 2,997,738; 3,030,658; 3,134,136; 3,167,810; and most recent, 3,380,115;
(b) Unloaders—U.S. Pat. Nos. 2,832,991; 2,832,992; 3,141,191; and 3,336,630.

These automatic loading and unloading concepts have contributed to the progress and enrichment of the art by eliminating tedious and inefficient manual press loading and unloading operations, thereby increasing press productivity and enhancing product quality and uniformity by minimizing the factor of human error inherent in prior manual loading and unloading methods.

The loader disclosed in U.S. Pat. No. 3,380,115 has proved to be a very successful design; being versatile in loading a variety of sizes of tire band diameters; being capable of loading both bias ply and radial ply tire bands; and being capable of selectively gripping an uncured tire band by either its exterior surfaces or by its upper bead region, as desired.

It has also been found that the loader of U.S. Pat. No. 3,380,115 is capable of handling even the large "off-the-road" tires, those, for example, of 90 inches in diameter. In so doing, the gripping means contact the upper bead area of an uncured tire band and expand radially to hold and subsequently lift the tire band for loading. It has been found, however, that if the radial holding pressure is maintained for some time, the gripping means will tend to lose its grip on these heavy tires, as the rubberized fabric layers or ply constructions enclosing the bead areas will tend to "give" or expand due to the radial force. Such loss of grip could result in a safety hazard if, for example, the grip was lost to the extent of dropping the tire on the workmen below, or could result in damage to the costly tire itself.

It has further been found that the presses used in vulcanizing these large tires cannot economically be used in conjunction with any of the aforementioned automatic unloading devices of the applicant. This is primarily due to the fact that the size of the cured tire prohibits it from being removed from the rear of the press, as the most recent unloaders have done, and also due to the fact the long curing time of these tires eliminates the necessity of having to use two separate devices to load and unload the press, for efficiency and speed of operation.

SUMMARY OF THE INVENTION

It is thus a primary object of the present invention to provide an automatic loading and unloading device for a tire press which maintains a substantially constant and uniform holding pressure on the tires being handled.

It is another object of the present invention to provide a safe and accurate means of loading and unloading large off-the-road tires into and out of a tire vulcanizing press.

It is a further object of the present invention to provide one device which is capable of both loading and unloading a tire into and out of a tire vulcanizing press.

These and other objects of the invention are advantageously accomplished by controlling the chuck assembly substantially as shown in U.S. Pat. No. 3,380,115 with a pivoted electric motor. The pivoted motor is oriented so as to sense a slight relaxation in the holding pressure being exerted on the tire, due to a limited distortion or yielding of the rubberized fabric layers of the tire band in the bead area, and to compensate therefor by slight expansion of the gripping means so as to maintain a holding pressure on the tire.

A preferred embodiment of the present invention is shown by way of example in the accompanying drawings and hereinafter described in detail without attempting to show all of the various forms and modifications in which the invention might be embodied; the invention being measured by the appended claims and not the details of the specification.

BRIEF DESCRIPTION OF THE DRAWINGS

FIG. 8 is an enlarged plan view showing in detail the control mechanism of the present invention as depicted in FIG. 3.

FIG. 9 is a vertical section taken substantially along line 9—9 of FIG. 8.

DESCRIPTION OF THE PREFERRED EMBODIMENT

Figure 1:
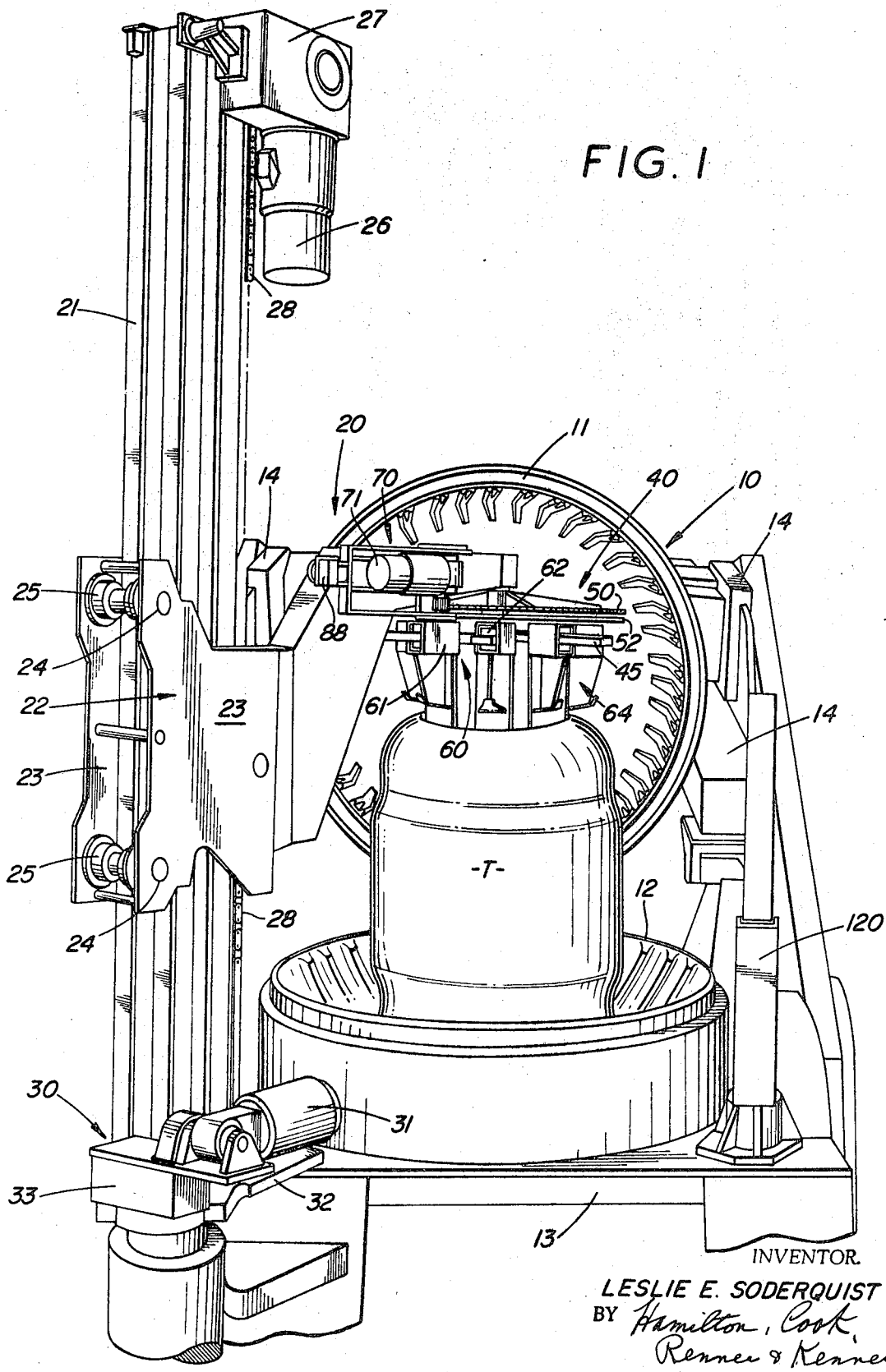
FIG. 1 is a perspective view of a tire shaping and curing press having automatic loading and unloading apparatus according to a preferred form of the present invention and depicting the loading of an uncured tire band into the lower mold cavity.

A tire curing press suitable for practice of the invention is indicated generally by the numeral 10 in FIG. 1 and has a movable upper mold section 11 and stationary lower mold section 12 mounted on a press base 13 having side guides 14. Press 10 has a general construction and operating mechanism as that shown in a number of prior art patents of the inventor, including U.S. Pat. No. 2,715,245 to which reference is made for such details as are required to more fully understand the invention. Press 10 is further preferably supplied with a permanent bag or diaphragm center mechanism (not shown), such as disclosed in the inventor's U.S. Pat. No. 2,699,572.

The automatic loading and unloading apparatus is designated generally as numeral 20 in FIG. 1. Loader 20 comprises a vertical column or stanchion 21 which is shown as being mounted near a front corner of the press 10. Stanchion 21 is preferably rectangular in cross section throughout most of its length and is described in more detail in the inventor's U.S. Pat. No. 3,167,810.

A jib arm or boom 22 of substantially rectangular cross section extends laterally of the stanchion 21 and includes two spaced apart side plates 23. Extending between plates 23 are shafts 24, each shaft 24 carrying a pair of rollers 25 which are adapted to ride on the flat surface of stanchion 21 when raised or lowered by a hoist motor 26. Motor 26 may be of any standard type, preferably electrically driven and including a magnetic brake 27. A chain 28 is shown as the power transmission means, it being understood that any suitable transmission means would be acceptable.

In order to rotate stanchion 21 to carry tires to and from the press, there is provided an "in and out" drive assembly 30, which may be an electric motor 31 as shown. Motor 31 is mounted on a suitable platform 32 and through a gear box 33 rotates a toothed disk (not shown) which is fixed to stanchion 21. Limit switches can be provided to regulate the position of the boom 22 to assure accurate alignment of the tire band T with the lower mold section 12 at one extreme and to assure accurate pick up off the floor or suitable platform at the other extreme. While an electric motor 31 is shown as the drive means, any suitable drive source, such as the hydraulic power source shown in U.S. Pat. No. 3,167,810, could be used to rotate stanchion 21.

Carried at the outer end of the jib arm or boom 22 is a tire band holding or chuck assembly 40 which is somewhat structurally similar to that disclosed in U.S. Pat. No. 3,380,115 to which reference is made for the details shown therein as are required to more fully understand the invention. However, as will hereinafter be described, the means to operate and control chuck assembly 440 are different from that shown in U.S. Pat. No. 3,380,115.

Figure 5:
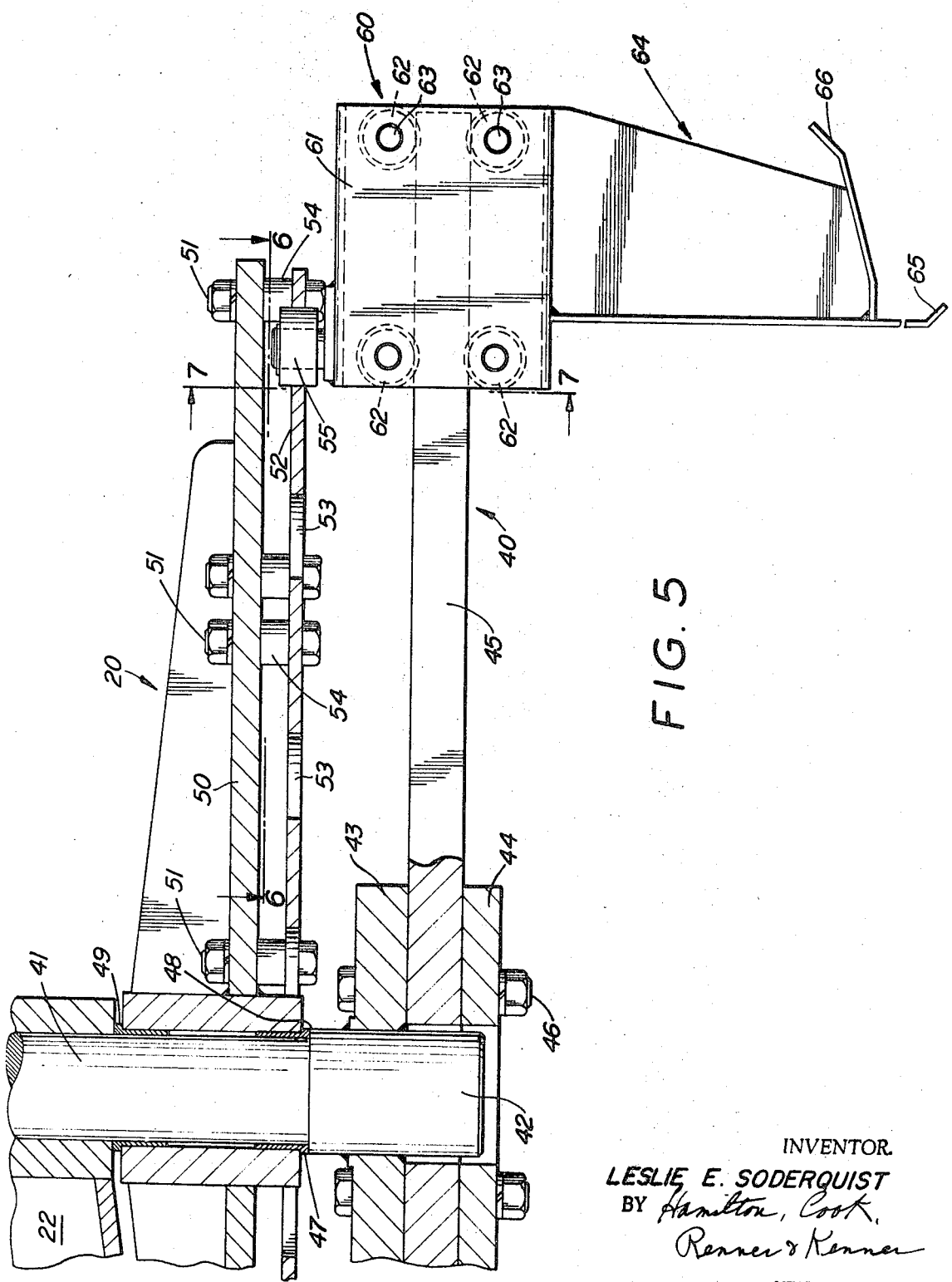
FIG. 5 is a cross sectional view taken substantially along line 5—5 of FIG. 2.

Chuck assembly 40 is carried on a stationary shaft 41 depending from the outer end of boom 22. As best seen in FIG. 5, shaft 41 has an enlarged diameter area 442 which has welded thereto an annular flange 43 which acts with a clamp plate 44 to fasten a plurality of radially extending arms or flat rail-spokes 45, as by bolts 446. Bushings 47 rest on the shoulder 48 and combine with bushings 49 to support a rotatable circular plate 50.

Figure 6:
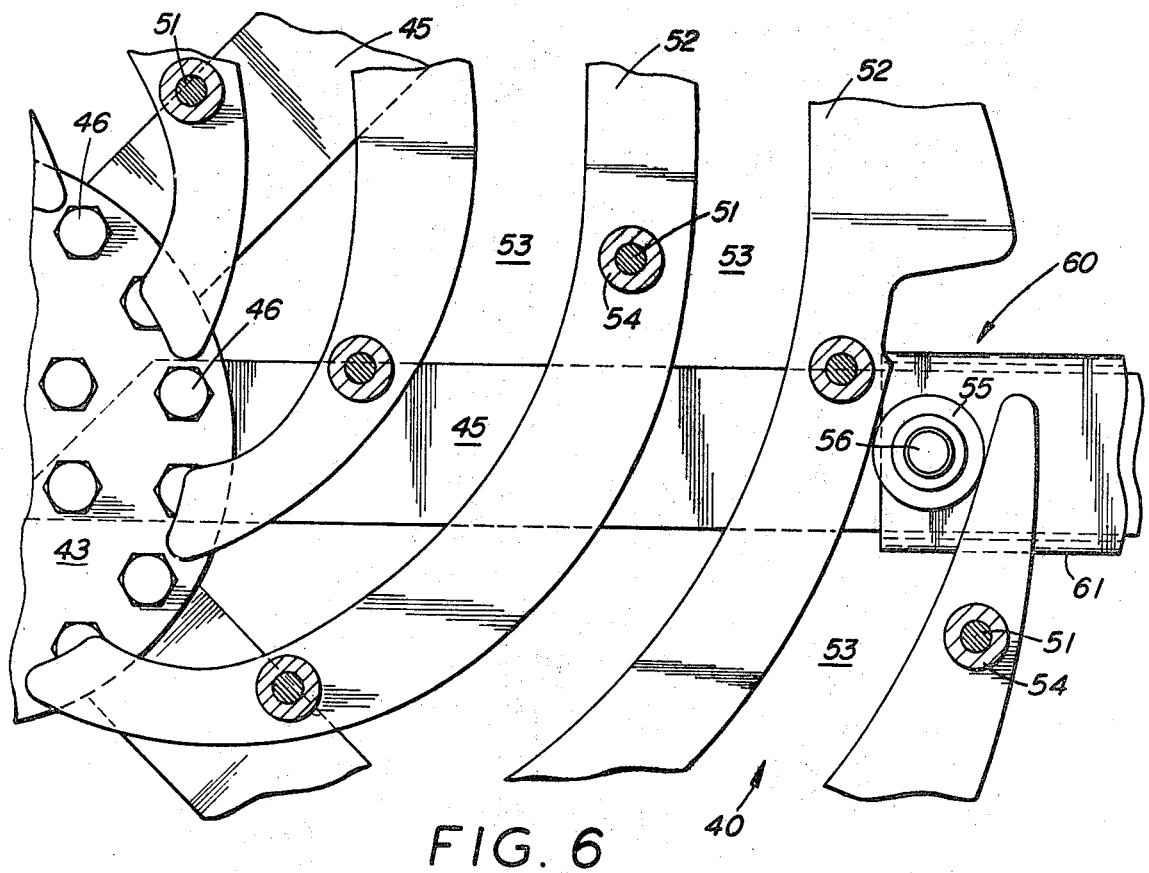
FIG. 6 is a sectional plan view taken substantially along line 6—6 of FIG. 5.

Depending from plate 50, as by a plurality of bolts 51, are a series of flat curved guide bars 52 which, as best seen in FIG. 6, combine when assembled to form generally spiral or skewed curvilinear guideways or cam channels 53. Guide bars 52 are maintained at a fixed distance from plate 50 by spacers 54.

Cam follower rollers 55, operatively disposed in guideways 53, are journaled on axles 56 on paddle trolley assemblies 60 which are radially movable along the flat rail-spokes 45. As will hereinafter be described, upon selective rotation of plate 50, each paddle trolley assembly 60 moves radially along the rail-spokes 45 due to the camming action produced between guideways 53 and rollers 55.

Figure 7:
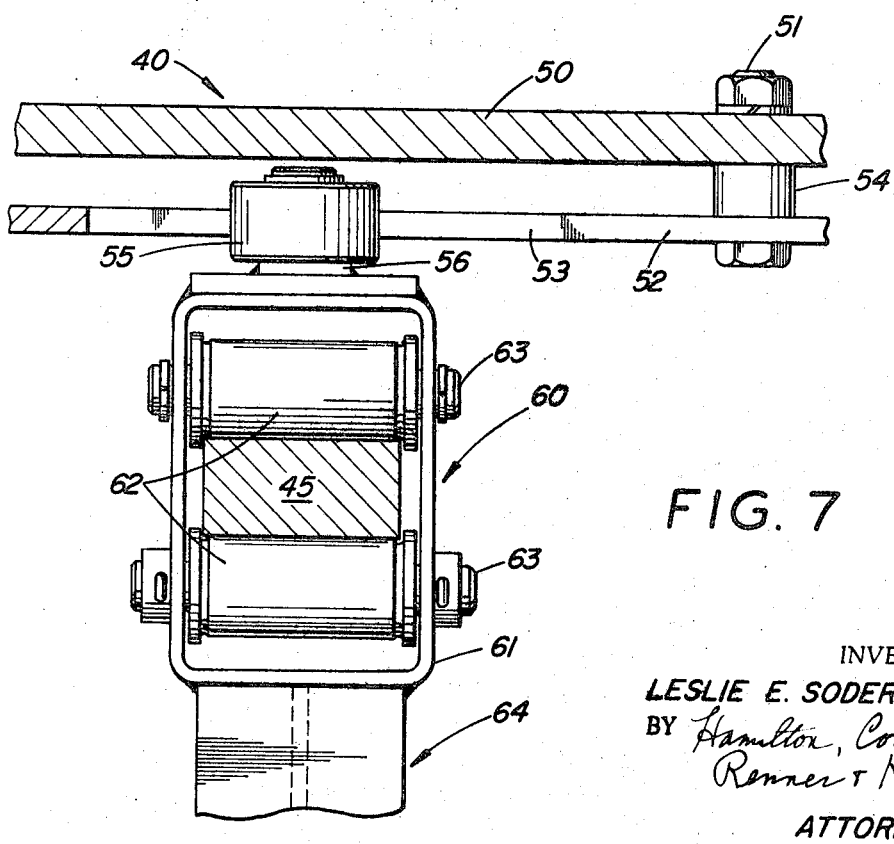
FIG. 7 is a sectional view taken substantially along line 7—7 of FIG. 5.

Referring to FIGS. 5 and 7, each paddle trolley assembly 60 has a square or rectangular tubular housing 61 telescoped over one of the flat rail-spokes 45. A pair of guide bogies 62 are mounted on axles 63 journaled on housing 61 above and below the rail-spokes 45. Depending from and secured to each paddle trolley assembly 60, as by welding to housing 61, is a tire band gripping paddle member 64 which can be contoured to grasp the exterior surface of a conventional or bias ply tire band. Each paddle 64 may also be formed with a transversely curved shoe 65, adapted to engage the inner edge of the upper bead of a tire band, as shown in FIG. 1, the paddles 64 may also be provided with lateral outwardly extending pusher plates 66 for contacting the upper surfaces of a tire band.

The tire band holding or chuck assembly 40, using a plurality of gripping paddle members 64, affords a wide range of radial adjustment by virtue of the plurality of curved guideways 53. Rotation of the plate 50 causes rollers 55 to move in guideways 53 which, in turn, moves the paddle carrying trolley assemblies 60 radially outward on spokes 45. To assure the trolleys do not move too far in either direction, boom 22 is equipped with a stop switch 56, which will contact a projecting lug 57 on plate 50 to turn off the power that rotates plate 50. To supply that power for rotating plate 50 and to assure that assembly 40 provides a substantially constant radial force on the tire bead, particularly of a large and heavy tire, there is a provided a pivoting motor drive assembly 70 indicated generally in FIGS. 2–4.

Figure 2:
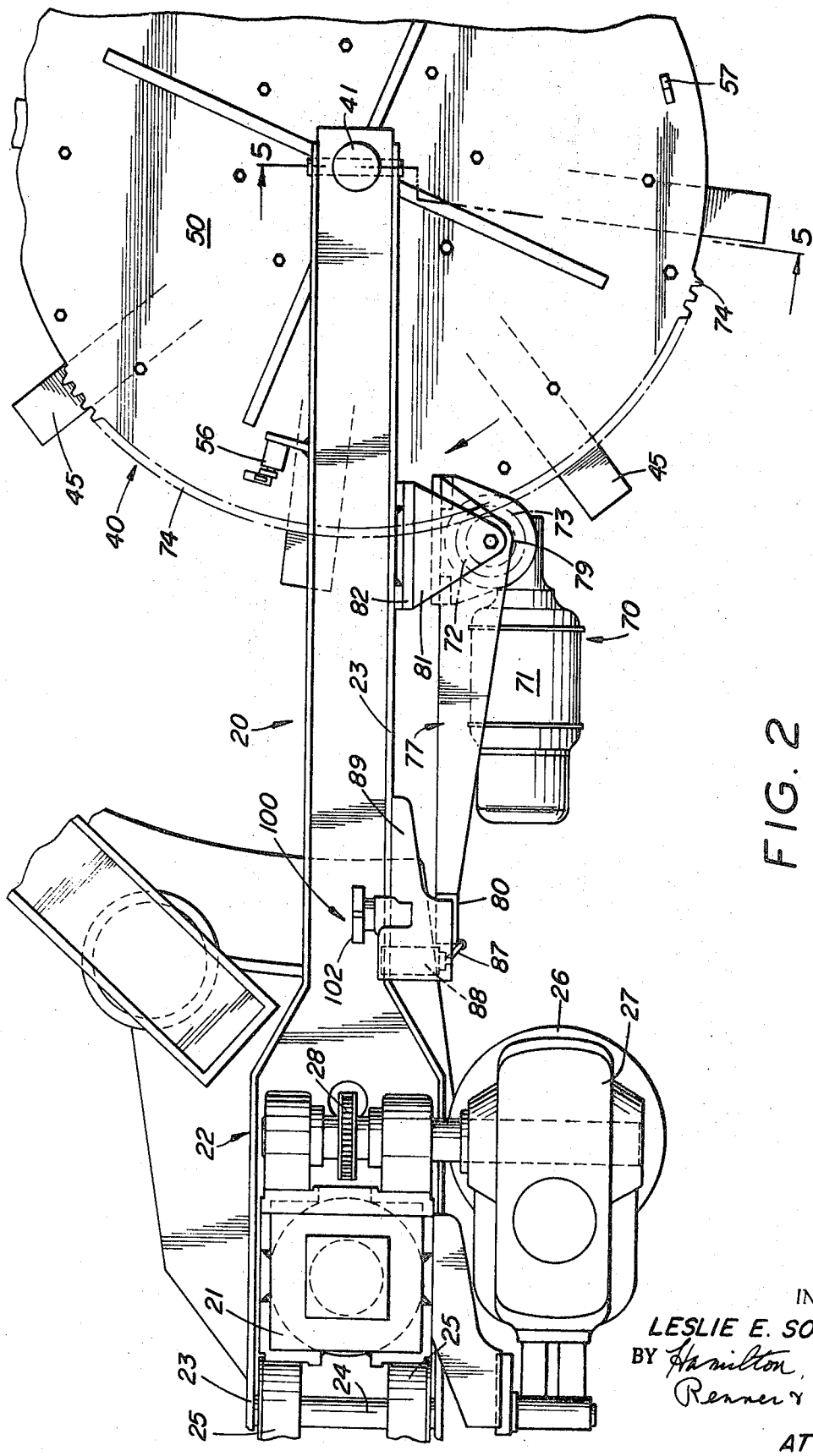
FIG. 2 is a partial top or plan view of the tire gripping means and the control means shown in FIG. 1.
Figure 4:
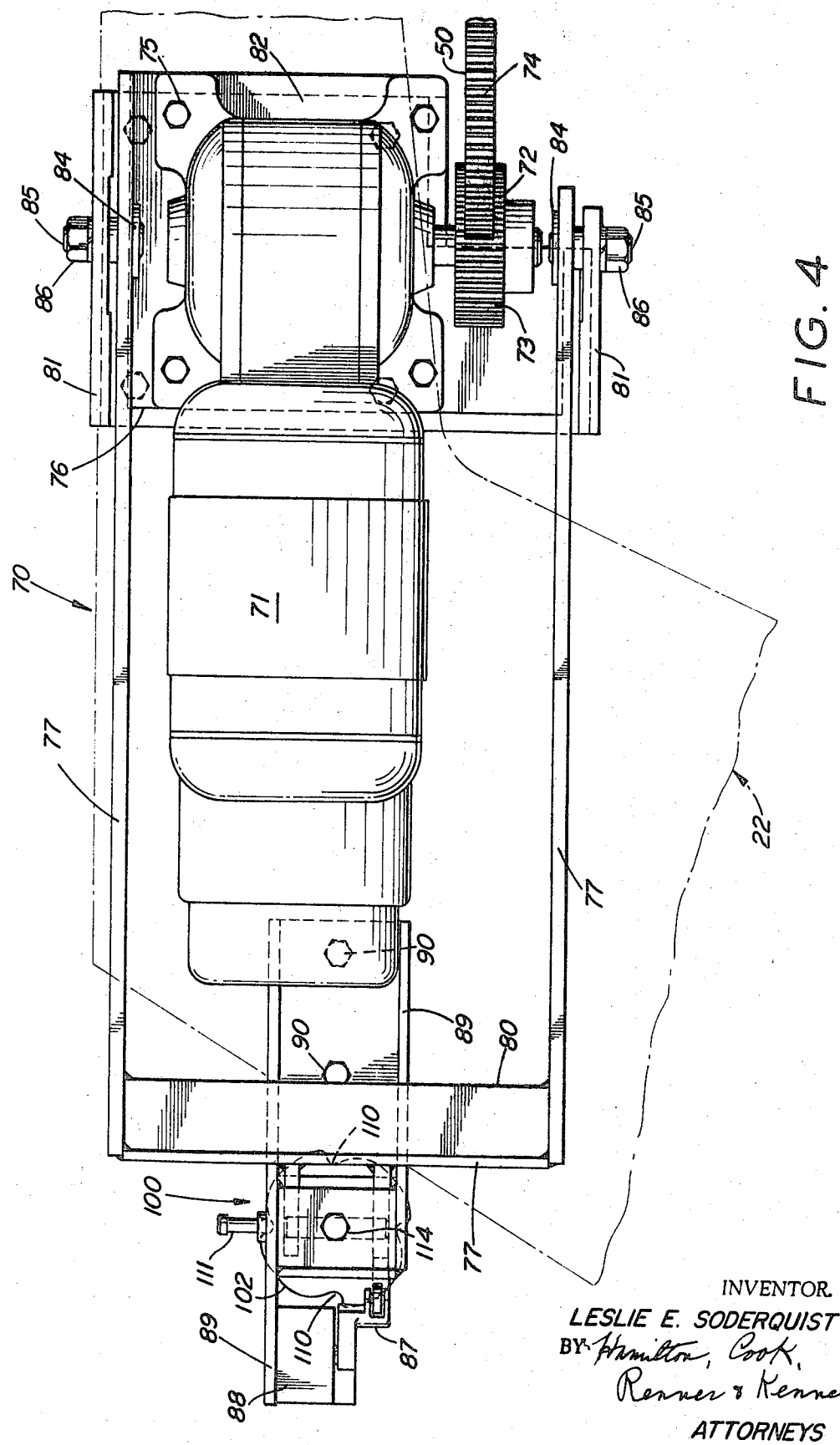
FIG. 4 is a side elevational view taken substantially along line 4—4 of FIG. 3.

The pivoting motor assembly 70 comprises a chuck motor 71 which, through a spur gear 72 having teeth 73, turns circular plate 50. The plate 50 has gear teeth 74 throughout a portion of its circumference to mesh with teeth 73. Motor 71 is mounted, as by bolts 75, to a base plate 76. Welded to base plate 76 is a torque arm frame 77 which is best shown in FIG. 4. As shown in the top view of FIG. 2, frame 77 is somewhat triangular therein having its lower corner 79 (as seen in FIG. 2) rounded off, and terminating at the outer end in a trip block 80.

Figure 3:
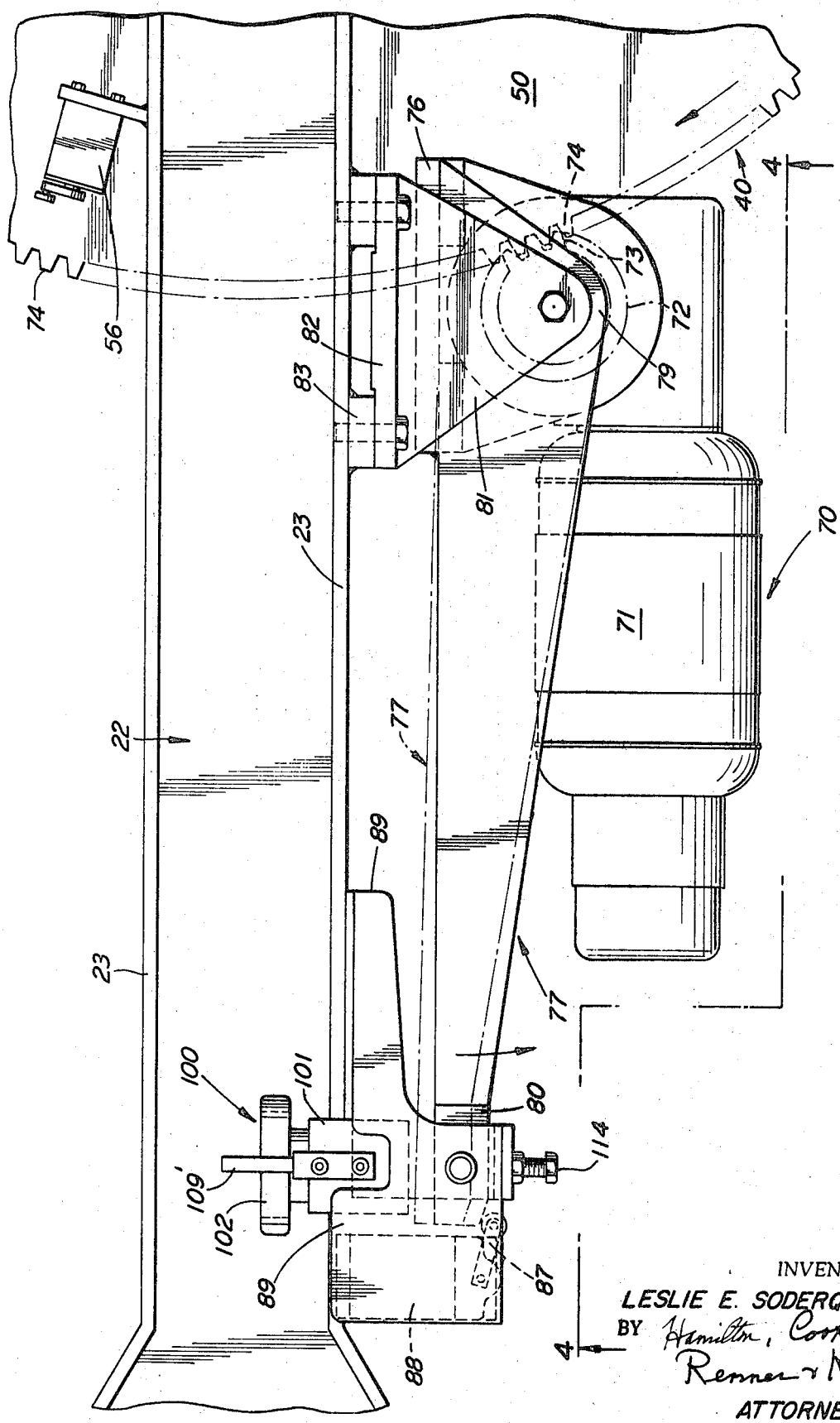
FIG. 3 is an enlarged plan view of the control means shown in FIG. 2.

As best seen in FIGS. 3 and 4, the pivoted motor assembly 70 which includes motor 71, base plate 76, frame 77 and the associated members, is rotatably mounted between upper and lower fixed clevis brackets 81 which, in turn, are mounted as by welding, to a stationary brace plate 82. As shown in FIG. 3, brace plate 82 is bolted to projecting lugs 83 on boom 22. Both brace plate 82 and base plate 76 have a corner section removed to allow for the free passage of teeth 74 on circular plate 50.

The pivoting or rotatable mount of drive assembly 70 between clevis brackets 81 is accomplished by bearings 84 mounted by bearing studs 85 fastened with nuts 86. As best shown in FIGS. 3 and 4, by so mounting the assembly 70, its axis of rotation can be oriented through the center of gear 72 the advantage of which will be hereinafter demonstrated.

The outer trip block 80 of frame 77 is adapted to selectively engage an actuating projection lever 87 of a limit switch 88 electrically connected to chuck motor 71. Switch 88 is mounted on a bracket 89 which is, in turn, attached to boom 22, as by bolts 90. The force capable of moving the trip block 80 toward lever 87 and also the force controlling rotatability of the frame and motor assembly 70 may be regulated by the torque adjustment attachment indicated generally by the numeral 100, best shown in FIGS. 8 and 9.

Torque adjustor 100 comprises an internally threaded cylindrical shell 101 which is welded to arm extensions 91 of bracket 89. Threaded into shell 101 is an adjusting knob 102 which has a stop shoulder 103 that can engage the top of shell 101. Knob 102 has an axial bore 104 therethrough which receives a guide rod 105. A sleeve 106 is received around the lower portion (FIG. 9) of rod 105 and is fastened thereto by pin 107. Telescopically received around rod 105 is a coil spring 108 which is maintained in a selective state of compression between lower shoulder 115 of knob 102 and upper shoulder 109 of sleeve 106. Pin 107 further extends through the trip block 80 of frame assembly 70 so that rotation of adjusting knob 102 can vary the force on trip block 80 by compressing or expanding spring 108. In the position shown in FIG. 9, the knob 102 is turned to its inward limits, stop shoulder 103 engaging the cylindrical shell 101 which represents maximum torque of the frame 77.

In order to lock the adjusting knob 102 in position, there is provided a detent 109' which selectively engages one of a plurality of depressions 110 in the perimeter of the knob 102 (FIG. 4). Detent 109' is kept in a locked position by two shoulder screws 111 threaded into cylindrical shell 101 and slidably received through the base 112 of detent 109'. A spring 113 is provided to maintain detent 109' in its locked position.

To set the limit switch 88 to an "on" position there is provided a stop bolt 114 which is threaded through bracket 89 and abuts the end of guide rod 105. Due to the mechanical connection of guide rod 105 to trip block 80 via pin 107 and associated members, an adjustment of bolt 114 will set the particular limit switch being used to actuate just before guide rod 105 contacts stop bolt 114. As will hereinafter be evident, this adjustment makes the mechanism more sensitive by eliminating any over travel of trip block 80.

In operation, acured tire is stripped from the lower mold 12 and held by conventional lifting arms, (a pillar 120 for which is shown in FIG. 1), such as disclosed in the inventor's U.S. Pat. No. 2,495,664.

Motor 31 is then actuated to align the loading and unloading assembly 20 with the cured tire and thereafter hoist motor 26 lowers the assembly so that the paddles 64 enter the tire. Actuation of motor 71 rotates the circular plate 50 in a clockwise direction (arrow in FIG. 3) to expand the paddles to grip the tire. Thereafter, sequential actuation of hoist motor 26 and electric motor 31 places the tire in front of the press on the floor, platform or dolly, so that it can be readily removed.

At any time the tire is being supported by paddles 64, whether during loading or unloading, the pivoting motor assembly 70, particularly frame 77, itself is in a position such as shown by the chain lines in FIG. 3. In this position, trip block 80 is not in contact with lever 87 of limit switch 88, the motor is off, and compression spring 108 is maintaining torque on gear 72 to hold an adequate grip on the tire.

If during either the loading or unloading procedure, the tire bead begins to distort or yield decreasing the radial holding force of paddles 64, the pivoted motor assembly 70 then acts to maintain a sufficient grip on the tire. As previously described, such a yielding is most apt to occur, if at all, during the loading cycle due to the fact that the uncured tire band is somewhat soft and if held for an extended period of time, might tend to expand under the radial pressure of paddles 64. Upon such an expansion, the paddles 64, as maintained by spring 108, will no longer be exerting the same force on the tire, and plate 50 will tend to rotate slightly clockwise (FIGS. 2 and 3) and thus reduce the reactive force slightly on gear 72. Since gear 72 is fixed when motor 71 is off, spring 108 will tend to balance the loss of force by moving the frame 77 in the direction of the arrow in FIG. 3 until contact is made with the lever arm 87 of switch 88, any overtravel of trip block 80 being prohibited by the original adjustment of bolt 114.

The limit switch 88 thus actuates motor 71 to turn plate 50 slightly in a clockwise direction (FIGS. 2 and 3) to increase the grip on the tire by expanding the paddles 64 radially outward. By thus sufficiently regripping the tire, the reactive force is increased and the pivoting mount of assembly 70 allows that force to be translated along frame 77 so that trip block 80 will move against spring 108 thereby releasing lever 87 of switch 88 to turn motor 71 off. Of course, should the tire begin to yield again, the assembly 70 is always capable of reactuation to balance the forces.

It should now be evident that the amount of force to be exerted on the tire band can be easily regulated by use of the adjusting knob 102 which through spring 108 exerts a torsion force on frame 77. Such adjustment may be desirable according to the various bead constructions of the tires being cured in press 10.

It is therefore apparent that a device constructed according to the concept of the present invention will perform the aforementioned objects of loading and unloading a tire safely and accurately without a danger of slippage or dropping, and will otherwise accomplish the objects of the invention.

What is claimed is:

1. In a tire vulcanizing press having gripping means for selectively loading and unloading cured and uncured tires, gripping control apparatus comprising a motor operatively connected to said gripping means, pivotally mounted frame means carrying said motor, switch means activating said motor means when contacted by said frame means, and torque means urging said frame toward said switch means when the holding force of said gripping means on the tire is decreased, said switch activating said motor to regain the grip on the tire and move said frame away from said switch to deactivate said motor.

2. In a tire vulcanizing press, according to claim 1, wherein said torque means also maintains the grip on the tire when said motor is deactivated.

3. A tire vulcanizing press according to claim 2, wherein said torque means comprises a spring.

4. A tire vulcanizing press according to claim 3, wherein said spring is located between said frame and an adjusting knob so that rotation of said knob selectively compresses and relaxes said spring.

5. A tire vulcanizing press according to claim 4, wherein said adjusting knob is provided with detent means for receiving a locking arm to prevent rotation of said adjusting knob while said spring is compressed or relaxed.

6. A tire vulcanizing press according to claim 5, wherein a stop means prevents overtravel of said frame against said switch.

7. A tire vulcanizing press according to claim 1, wherein said frame is an elongate member having said motor mounted near one end thereof and communicating with said torque means near the other end thereof.

8. A tire vulcanizing press according to claim 1, wherein the operative connection between said motor and the gripping means is a gear train.

References Cited

UNITED STATES PATENTS

| | | | |
|---|---|---|---|
| 3,134,136 | 5/1964 | Soderquist | 18—2TP |
| 3,167,810 | 2/1965 | Soderquist | 18—2TP |
| 3,222,715 | 12/1965 | Harris | 18—2TP |
| 3,053,400 | 9/1962 | Erickson et al. | 18—2TPX |
| 3,091,801 | 6/1963 | Erickson et al. | 18—2TP |
| 3,380,115 | 4/1968 | Soderquist | 18—2TP |

J. HOWARD FLINT, Jr., Primary Examiner